Figure 1:
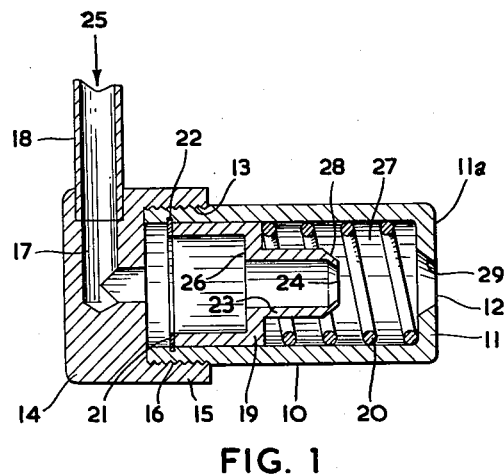

Jan. 31, 1961     K. W. JAY     2,969,924

FUEL NOZZLES FOR LARGE FLOW RANGE

Filed April 4, 1958

INVENTOR
K. W. JAY
BY Maybee & Legris
ATTORNEYS

United States Patent Office 2,969,924
Patented Jan. 31, 1961

2,969,924
FUEL NOZZLES FOR LARGE FLOW RANGE

Kenneth William Jay, North York Township, Ontario, Canada, assignor to Orenda Engines Limited, Malton, Ontario, Canada, a corporation Filed Apr. 4, 1958, Ser. No. 726,396

2 Claims. (Cl. 239—436)

This invention relates to fluid delivery nozzles and in particular to a fluid delivery nuozzle which is adapted for use over a wide flow range.

Fluid flowing through a plain orifice experiences a pressure drop which varies as the square of the flow. As a result, if a fluid nozzle is provided with a single, plain, fixed orifice either an impossibly high pump pressure is required for large flows, or a very low pressure is required for small flows. A low pressure is difficult to achieve where a number of nozzles are used in parallel because it results in poor matching of flows to the various nozzles and causes fuel evaporation in the line and at the pump with a possible blockage of the system. A very high pressure is, of course, a disadvantage since large, heavy pumps are required and sturdy fluid conduits necessary in order to withstand the high pressures.

Situations requiring a large flow range are very frequently encountered in aircraft gas turbine engines where, cruising speeds at high altitudes require a relatively small amount of fuel whereas high speed runs, at low altitudes require an excessively large flow of fuel.

It is an object of the present invention to provide a fluid delivery nozzle which is adapted for delivering fuel over a very wide range of flows without the attendant disadvantages of extremely high pump pressures, on the one hand, and extremely low pump pressures, on the other hand.

Figure 2:
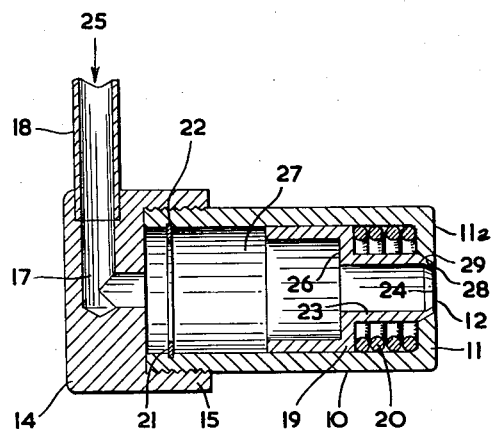

The invention is described with reference to the accompanying drawings which illustrate a preferred embodiment of the invention in which like reference numerals denote like parts in the various views and in which:

Figure 1 is an axial section of a fluid nozzle constructed in accordance with the present invention, and Figure 2 is a view similar to Figure 1 showing the internal parts in a different position.

Referring now to Figure 1 the nozzle will be seen to comprise a barrel 10 which is cylindrical in cross-section and which, at one end, is closed by an end plate 11 provided with a central circular orifice 12. The end plate 11, in the embodiment shown, is formed integrally with the side walls of the barrel 10 but, of course, could be separate from the side walls and secured thereto by any suitable means such as welding.

At the other end of the barrel 10 there are provided screw threads 13 by means of which the barrel may be secured to an end cap 14 which is provided with an axially extending sleeve 15 having internal screw threads 16 which engage with screw threads 13 on the barrel 10. The cap 14 is provided with a bore 17 which is in communication with a fluid line 18 which leads to the interior of the barrel 10.

Within the barrel 10 is a piston 19 which is slidable therein and which is biased by means of spring 20 away from the orifice 12 against a stop which is constituted by a circlip 21 set in an annular groove 22 formed in the interior of the side wall of the barrel 10.

The piston 19 is provided with a hollow axial extension 23 which terminates, at the end adjacent the first orifice 12 in a second orifice 24 which is coaxial with the first orifice 12.

In operation fluid enters the conduit 18 in the direction of the arrow 25 and passes through bore 17 into the hollow interior of the barrel 10 and exerts a pressure against the surface 26 of the piston 19. From the interior of the barrel 10 upstream of the piston 19 the fluid will pass through the hollow axial extension 23 and orifice 24 and enter chamber 27 within the barrel 10 experiencing a pressure drop as it passes through the orifice 24. From the chamber 27 the fluid will pass outwardly through the first orifice 12 experiencing a second pressure drop as it does so.

Since the pressure drop across two orifices in series is equal to the tum of the pressure drop across each of the orifices, the fluid passing through orifice 12 will have experienced two pressure drops during its passage from the line 18 through the orifice 12.

As a result, the total pressure drop through the nozzle is the sum of the pressure drops through the two orifices. Thus at low flows a relatively high pressure drop (low co-efficient of discharge) is achieved which results in the line pressure and pump pressure being maintained at a value which will prevent vaporization and which will ensure an even distribution of fluid throughout the system in the event that several of these nozzles are employed in parallel.

As the pressure in line 18 is increased due to a demand for an increased flow from the nozzle, the piston 19 will be urged towards the first orifice 12 against the spring 20 and when the pressure against face 26 of piston 19 exceeds the pressure exerted by the spring 20 the piston 19 will move to the right in Figure 1 until it occupies the position shown in Figure 2 where the second orifice 24 lies within the first orifice 12 giving the hydraulic effect of a single orifice and, as a result, a higher co-efficient of discharge. As a result, at maximum flow the pressure drop is reduced and the pressure in the line 18 maintained at a reasonable level.

It is to be noted that the end of the extension 23 is provided with a frusto-conical surface 28 which is adapted to seat within the fruston-conical surface 29 of the first orifice 12 thereby bringing the edge of the second orifice 24 into substantial alignment with the external surface 11a of the end wall 11 containing the first orifice 12.

The invention has been described with reference to a single preferred embodiment and it is to be appreciated that minor modifications may be made within the spirit of the invention as defined by the appended claims.

What I claim as my invention is:

1. A fluid delivery nozzle comprising a hollow barrel closed at one end by an end plate having a first orifice therein of a restricted size with respect to the diameter of the barrel, the other end of the barrel communicating with a fluid conduit adapted to deliver fluid under pressure, a hollow piston slidable in the barrel and spring biased away from said end plate, the piston carrying a hollow axial extension thereon projecting towards the end plate, the extension having a second orifice therein through which fluid may flow from the conduit through the hollow piston and extension, the piston, extension and second orifice being movable under fluid pressure in the conduit from a first position in which the piston is at a point remote from the end plate and the second orifice is spaced above the end plate having the first orifice and fluid flows from the conduit through the hollow piston, extension and second orifice into the barrel experiencing as it does so, a first pressure drop and thence flows from the hollow barrel through the first orifice in the end plate experiencing as it does so, a second pressure drop; to a second position in which the second orifice lies within the first orifice and seals the first orifice from flow of fluid from said barrel and fluid flowing from the conduit flows into the barrel on that side of the piston remote from the end plate and thence flows only through the hollow piston, extension and second orifice experiencing as it does so, only a single pressure drop.

2. A fluid delivery nozzle as claimed in claim 1 in which the barrel is cylindrical and the first and second orifices are co-axial with one another and with the barrel.

References Cited in the file of this patent
UNITED STATES PATENTS

| | | |
|---|---|---|
| 2,680,043 | Campbell | June 1, 1954 |
| 2,703,195 | Froidevaux | Mar. 1, 1955 |
| 2,803,499 | Goyette et al. | Aug. 20, 1957 |